(12) United States Patent
Pires Arrifano et al.

(10) Patent No.: US 12,131,715 B2
(45) Date of Patent: Oct. 29, 2024

(54) ATTENUATING WAVEFRONT DETERMINATION FOR NOISE REDUCTION

(71) Applicants: DOLBY LABORATORIES LICENSING CORPORATION, San Francisco, CA (US); DOLBY INTERNATIONAL AB, Amsterdam Zuidoost (NL)

(72) Inventors: Angelo Miguel Pires Arrifano, Alpes-Maritimes (FR); Juan P. Pertierra, Fishers, IN (US)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 549 days.

(21) Appl. No.: 17/424,155

(22) PCT Filed: Jan. 16, 2020

(86) PCT No.: PCT/US2020/013950
§ 371 (c)(1),
(2) Date: Jul. 19, 2021

(87) PCT Pub. No.: WO2020/150523
PCT Pub. Date: Jul. 23, 2020

(65) Prior Publication Data
US 2022/0101807 A1    Mar. 31, 2022

Related U.S. Application Data

(60) Provisional application No. 62/794,271, filed on Jan. 18, 2019.

(51) Int. Cl.
*G02B 26/00* (2006.01)
*G02B 26/06* (2006.01)
(Continued)

(52) U.S. Cl.
CPC .......... *G09G 3/3666* (2013.01); *G02B 26/06* (2013.01); *G02F 1/01* (2013.01); *G03H 1/0443* (2013.01);
(Continued)

(58) Field of Classification Search
CPC ................................. G02B 26/06; G02F 1/01
See application file for complete search history.

(56) References Cited

U.S. PATENT DOCUMENTS

| 6,016,210 A | 1/2000 | Stappaerts |
| 7,193,765 B2 | 3/2007 | Christensen |

(Continued)

FOREIGN PATENT DOCUMENTS

| CN | 106444053 A | 2/2017 |
| CN | 206115152 U | 4/2017 |

(Continued)

OTHER PUBLICATIONS

US 9,906,760 B2, 02/2018, Damberg (withdrawn)
(Continued)

*Primary Examiner* — Joseph P Martinez

(57) ABSTRACT

A system and method comprise a light source; a spatial light modulator including a substantially transparent material layer and a phase modulation layer; an imaging device configured to receive a light from the light source as reflected by the spatial light modulator, and to generate an image data; and a controller. The controller provides a phase-drive signal to the spatial light modulator and determines an attenuating wavefront of the substantially transparent material layer based on the image data.

15 Claims, 8 Drawing Sheets

(51) Int. Cl.
*G02F 1/01* (2006.01)
*G03H 1/04* (2006.01)
*G03H 1/22* (2006.01)
*G09G 3/36* (2006.01)

(52) U.S. Cl.
CPC ... *G03H 1/2294* (2013.01); *G03H 2001/2215* (2013.01)

(56) References Cited

U.S. PATENT DOCUMENTS

| | | | |
|---|---|---|---|
| 7,400,449 | B2 | 7/2008 | Christensen |
| 7,959,297 | B2 | 6/2011 | Silverstein |
| 8,031,382 | B2 | 10/2011 | Johnson |
| 8,437,059 | B2 | 5/2013 | Golan |
| 8,665,504 | B2 | 3/2014 | Awatsuji |
| 8,888,296 | B2 | 11/2014 | Ota |
| 9,848,176 | B2 | 12/2017 | Damberg |
| 9,874,319 | B2 | 1/2018 | Minor |
| 10,003,776 | B2 | 6/2018 | Damberg |
| 2002/0122254 | A1 | 9/2002 | Gluckstad |
| 2010/0165429 | A1* | 7/2010 | Buckley ............ G03H 1/2205 359/9 |
| 2012/0116703 | A1 | 5/2012 | Pavillon |
| 2014/0293388 | A1 | 10/2014 | Matsumoto |
| 2015/0085069 | A1 | 3/2015 | Yamaichi |
| 2015/0277137 | A1 | 10/2015 | Aschwanden |
| 2016/0124221 | A1 | 5/2016 | Huang |
| 2016/0223987 | A1 | 8/2016 | Park |
| 2017/0180708 | A1 | 6/2017 | Hazeghi |
| 2018/0048873 | A1 | 2/2018 | Damberg |
| 2018/0176519 | A1 | 6/2018 | Damberg |

FOREIGN PATENT DOCUMENTS

| | | |
|---|---|---|
| CN | 109212796 A | 1/2019 |
| DE | 69714807 T2 | 4/2003 |
| EP | 2919055 A1 | 9/2015 |
| JP | 2007116136 A | 5/2007 |
| KR | 20130106723 A | 9/2013 |
| TW | 201300834 A | 1/2013 |
| WO | 2015072737 A1 | 5/2015 |
| WO | 2015104239 A2 | 7/2015 |
| WO | 2016019204 A1 | 2/2016 |
| WO | 2017115081 A1 | 7/2017 |

OTHER PUBLICATIONS

Bianco, V. et al "Quasi noise-free digital Holography" Light: Science & Applications, 2016, pp. 1-13.

Pang, H. et al "High-accuracy method for holographic image projection with suppressed speckle noise" vol. 24, No. 20, Oct. 3, 2016.

* cited by examiner

ATTENUATING WAVEFRONT DETERMINATION FOR NOISE REDUCTION

BACKGROUND

1. Field of the Disclosure

This application relates generally to the attenuation of low frequency or DC-noise.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulators (SLMs), and the like.

BRIEF SUMMARY OF THE DISCLOSURE

Various aspects of the present disclosure relate to circuits, systems, and methods for determining an attenuating wavefront in a projector.

In one exemplary aspect of the present disclosure, there is provided a system, comprising a light source; a spatial light modulator including a substantially transparent material layer and a phase modulation layer; an imaging device configured to receive a light from the light source as reflected by the spatial light modulator, and to generate an image data; and a controller. The controller is configured to provide a phase-drive signal to the spatial light modulator, and determine an attenuating wavefront of the substantially transparent material layer based on the image data.

In another exemplary aspect of the present disclosure, there is provided a method of driving an optical system, comprising: providing a phase-drive signal to a spatial light modulator, the spatial light modulator including a substantially transparent material layer and a phase modulation layer; generating an image data based on receiving a light from a light source that has been reflected by the spatial light modulator and received by an imaging device; and determining an attenuating wavefront of the substantially transparent material layer based on the image data.

In another exemplary aspect of the present disclosure, there is provided a non-transitory computer-readable medium storing instructions that, when executed by a processor of a computer, cause the computer to perform operations comprising providing a phase-drive signal to a spatial light modulator, the spatial light modulator including a substantially transparent material layer and a phase modulation layer; generating an image data based on receiving a light from a light source that has been reflected by the spatial light modulator and received by an imaging device; and determining an attenuating wavefront of the substantially transparent material layer based on the image data.

In this manner, various aspects of the present disclosure provide for the attenuation of low frequency and DC-noise (also referred to as "wavefront correction"), and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to reduce or attenuate noise; for example, microscopy, image sensing, telecommunications, non-projection image display, and so on.

Projector Systems

In a projector system, various internal components, such as components of the optical system, may contain irregularities which introduce amplitude and/or phase variations in the optical wavefront from the light source. These irregularity-containing wavefronts may further interact with other components of the optical system, resulting in low frequency noise visible at the reconstruction plane.

Figure 1:
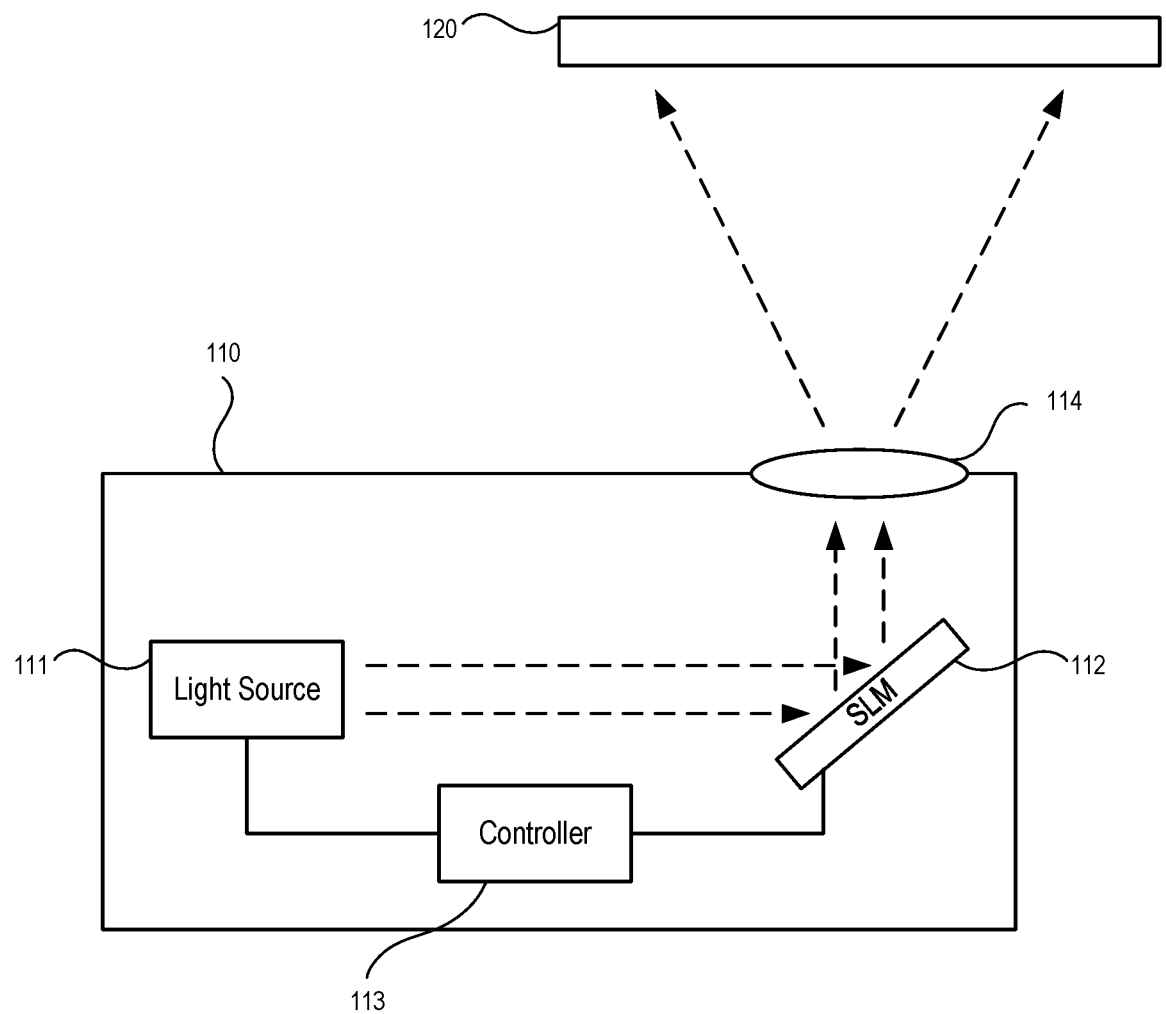
FIG. 1 illustrates a block diagram of an exemplary projector according to various aspects of the present disclosure.

FIG. 1 illustrates an exemplary projection system according to various aspects of the present disclosure. Specifically, FIG. 1 illustrates a projector 110 which includes a light source 111, an SLM 112, a controller 113 operatively connected to the light source 111 and the SLM 112, and a projection lens 114. The projector 110 projects light toward a screen 120. In practice, the projector 110 may include additional components such as a memory, input/output ports, communication circuitry, a power supply, and the like. Furthermore, the projector 110 may include additional optical components such as mirrors, lenses, waveguides, optical fibers, beam splitters, diffusers, additional SLMs, and the like. For ease of explanation, these additional components are not illustrated here.

The light source 111 may be, for example, a laser light source, a high-pressure discharge lamp, an LED, and the like. In some aspects of the present disclosure, the light source 111 may comprise multiple light sources 111, each corresponding to a different wavelength or wavelength band. The light source 111 emits light in response to an image signal provided by the controller 113. The controller 113 may be, for example, a processor such as a central processing unit (CPU) of the projector 110. The controller 113 also controls the SLM 112, which receives light from the light source 111. The SLM 112 imparts a spatially-varying modulation, such as a phase modulation, to the light, and redirects the modulated light toward the projection lens 114. The SLM 112 may be, for example, a liquid-crystal-on-silicon (LCOS) SLM, such as a reflective LCOS SLM or a transmissive LCOS SLM.

Figure 2:
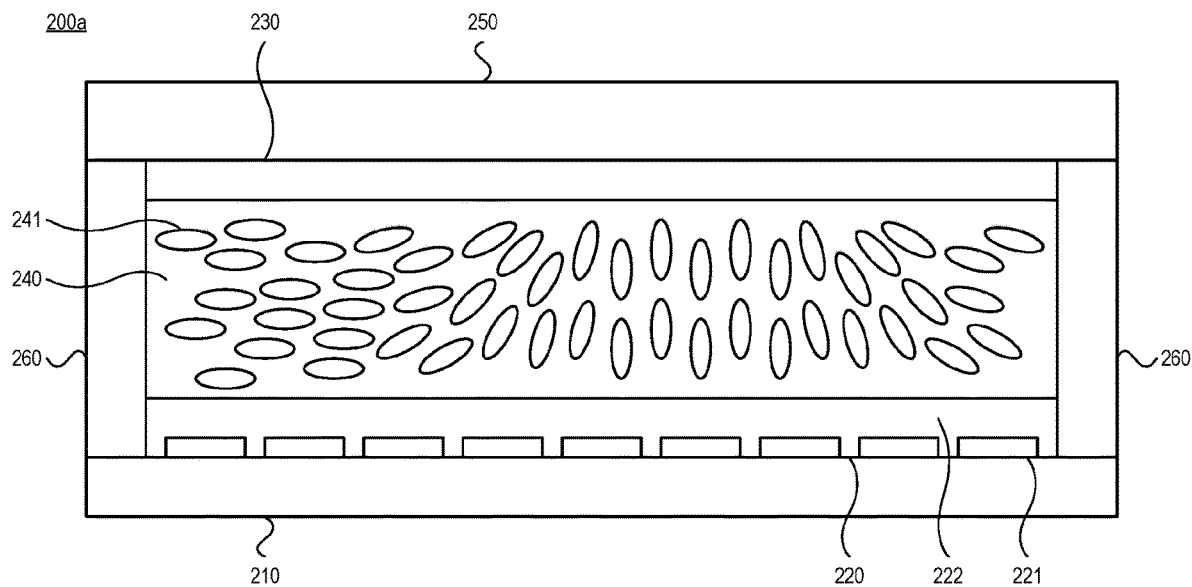
FIG. 2 illustrates an exemplary SLM for use with various aspects of the present disclosure.
Figure 3:
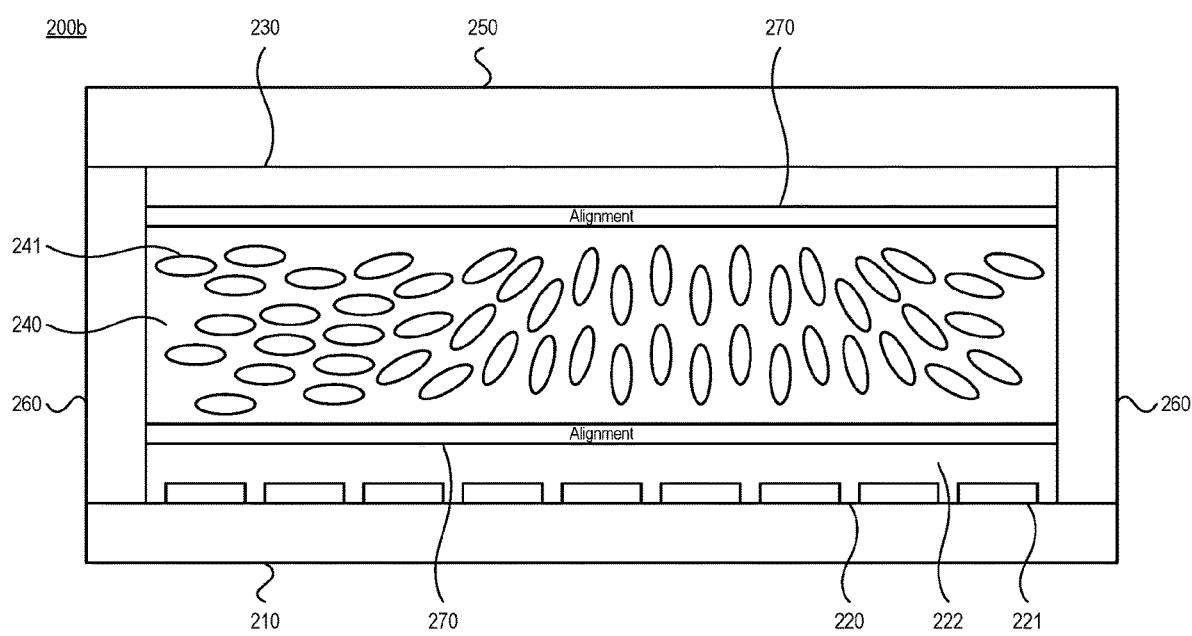
FIG. 3 illustrates another exemplary SLM for use with various aspects of the present disclosure.

FIGS. 2 and 3 illustrate examples of the SLM 112 implemented as a reflective LCOS SLM and shown in a partial cross-sectional view. As illustrated in FIG. 2, an SLM 200a includes a silicon backplane 210, a first electrode layer 220, a second electrode layer 230, a liquid crystal layer 240 (an example of a "phase modulation layer"), a cover glass 250 (an example of a "substantially transparent material layer"), and spacers 260. The silicon backplane 210 includes electronic circuitry associated with the SLM 200a, such as complementary metal-oxide semiconductor (CMOS) transistors and the like. The first electrode layer 220 includes an array of reflective elements 221 disposed in a transparent matrix 222. The reflective elements 221 may be formed of any highly reflective material, such as aluminum or silver. The transparent matrix 222 may be formed of any highly transmissive material, such as a transparent oxide. The second electrode layer 230 may be performed of any transparent conductive material, such as a thin film of indium tin oxide (ITO). The second electrode layer 230 may be provided as a common electrode corresponding to a plurality of the reflective elements 221 of the first electrode layer 220. In such a configuration, each of the plurality of the reflective elements 221 will couple to the second electrode layer 230 via a respective electric field, thus dividing the SLM 200a into an array of pixel elements. Thus, individual ones (or subsets) of the plurality of the reflective elements 221 may be addressed via the electronic circuitry disposed in the silicon backplane 210.

The liquid crystal layer 240 is disposed between the first electrode layer 220 and the second electrode layer 230, and includes a plurality of liquid crystals 241. The liquid crystals 241 are particles which exist in a phase intermediate between a solid and a liquid; in other words, the liquid crystals 241 exhibit a degree of directional order, but not positional order. The direction in which the liquid crystals 241 tend to point is referred to as the "director." The liquid crystal layer 240 modifies incident light entering from the cover glass 250 based on the birefringence Δn of the liquid crystals 241, which may be expressed according to the following expression (1):

$$\Delta n = n_e - n_o \qquad (1)$$

In expression (1), $n_e$ refers to the refractive index in a direction parallel to the director ("extraordinary refractive index") and $n_o$ refers to the refractive index in a direction perpendicular to the director ("ordinary refractive index"). From expression (1), the maximum optical path difference, referred to as the "retardation" Γ, may be expressed according to the following expression (2):

$$\Gamma = \Delta n \times t \qquad (2)$$

In expression (2), t refers to the thickness of the liquid crystal layer 240. This thickness is set by the spacer 260, which seals the SLM 220a and ensures a set distance between the cover glass 250 and the silicon backplane 210. The liquid crystals 241 generally orient themselves along electric field lines between the first electrode layer 220 and the second electrode layer 230. As illustrated in FIG. 2, the liquid crystals 241 near the center of the SLM 220a are oriented in this manner, whereas the liquid crystals 241 near the periphery of the SLM 220a are substantially non-oriented in the absence of electric field lines. By addressing individual ones of the plurality of reflective elements 221 via a phase-drive signal, the orientation of the liquid crystals 241 may be determined on a pixel-by-pixel basis.

FIG. 3 illustrates an SLM 200b that is structurally similar to the SLM 200a, with the exception that the SLM 200b includes alignment layers 270 on both sides of the liquid crystal layer 240. The alignment layers 270 are preferably made from a polymer material, and serve to align the liquid crystals 241 so as to reduce response time. In contrast, the SLM 200a may effect alignment of the liquid crystals 241 by patterning or nanostructuring the first electrode layer 220 and the second electrode layer 230, by mixing an appropriate compound in the liquid crystal layer 240, or other techniques.

In a projector, incident light enters the SLM 200a or 200b, passes through the cover glass 250 and the second electrode layer 230 (and, if present, the alignment layer 270). In this manner, the cover glass is substantially transparent; in other words, the cover glass has a transmissivity of approximately 90% or greater. The light is then subjected to a phase modulation via the liquid crystal layer 240 and is reflected by the first electrode layer 220 to eventually exit the SLM 200a or 200b via the cover glass 250.

In practical applications, while most of the optical energy of the incident light traverses the cover glass 250 into the liquid crystal layer 240, the surface of the cover glass 250 reflects back some of the optical energy of the incident light. The surface of the cover glass 250 has irregularities which may introduce amplitude and phase variations in the wavefront reflected therefrom. This directly-reflected wavefront then interferes with the wavefront modulated by the liquid crystals 241 and reflected from the first electrode layer 220, which creates low-frequency noise visible at the reconstruction.

While the above description has been provided in the context of an LCOS SLM, it should be understood that the present disclosure is not limited to LCOS SLMs. In general, the present disclosure is applicable to any type of activematrix phase modulator that has a cover glass or any transparent material layer and that may introduce low-frequency (DC-) noise.

Derivation of the Attenuating Wavefront

Figure 4:
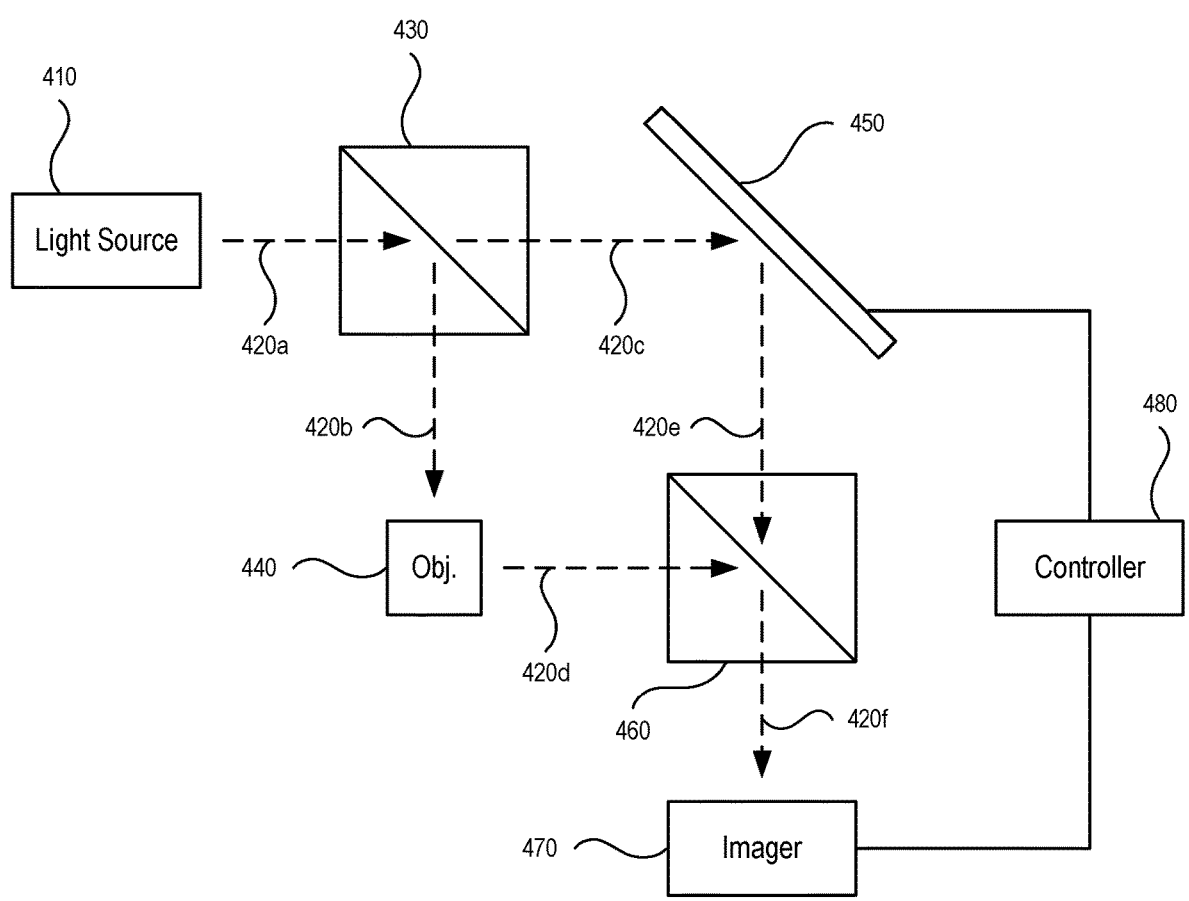
FIG. 4 illustrates a block diagram of an exemplary phase-shifting holography system.

In order to compensate for the DC-noise introduced by the cover glass 250 (or other transparent material), it is possible to derive the attenuating wavefront using, for example, phase-shifting holography. FIG. 4 illustrates the concept of phase-shifting holography via an exemplary phase-shifting holography system.

The exemplary system includes a light source 410 which emits a coherent light 420a; a beam splitter 430 which splits the coherent light 420 into first and second propagating wavefronts 420b and 420c; an object 440 (e.g., a cover glass or a transparent material) which reflects the first propagating wavefront 420b to generate a first reflected wavefront 420d, wherein the first reflected wavefront 420d carries a surface description of the object 440 as an amplitude and phase modulation; a controllable piezoelectric mirror 450 which reflects the second propagating wavefront 420c to generate a second reflected wavefront 420e; a beam combiner 460 which combines the first and second reflected wavefronts 420d and 420e into a combined wavefront 420f; and an imager which captures the resulting interference in the combined wavefront 420f. The piezoelectric mirror 450 and the imager 470 are operably connected to a controller 480, thereby to introduce a predetermined phase-delay pattern into the second reflected wavefront 420e and thereby to process an image data from the imager 470. The controller 480 may thus derive a complex-amplitude description of the surface of the object 440.

Figure 5:
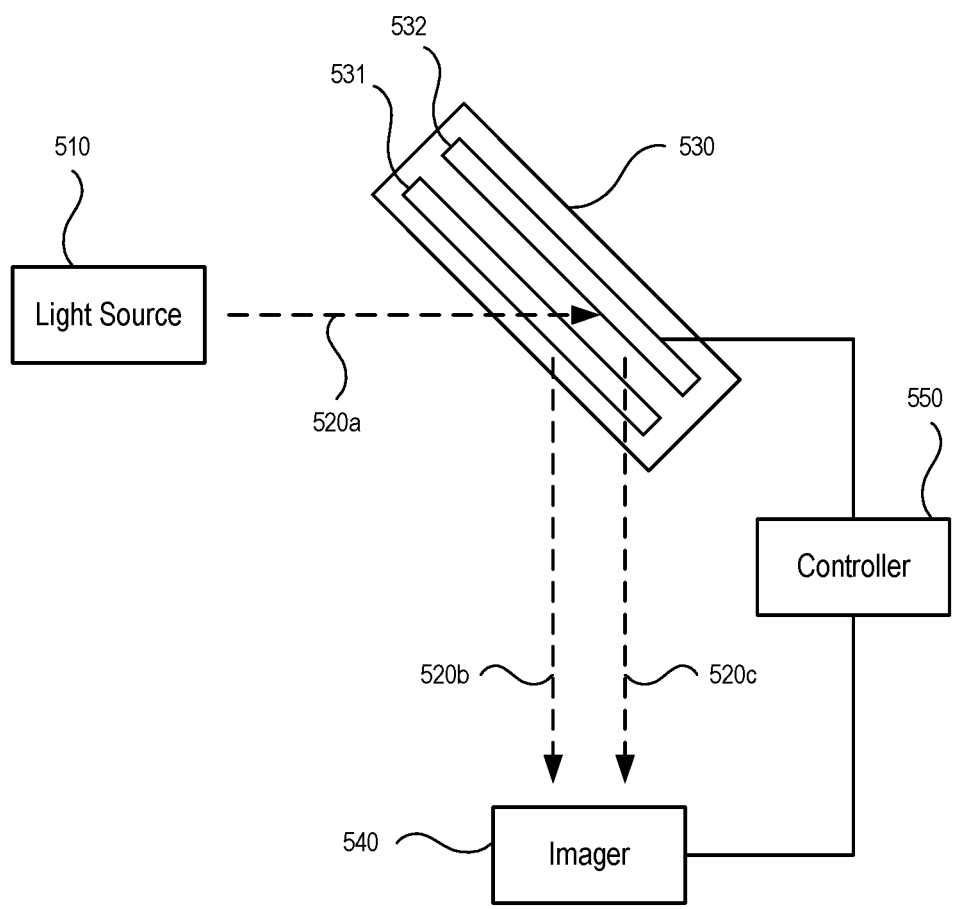
FIG. 5 illustrates a block diagram of an exemplary noise derivation system according to various aspects of the present disclosure.

The concept of phase-shifting holography may be applied to a projection system including, for example, an SLM, to compensate low-frequency noise introduced by the cover glass or transparent material of the SLM. FIG. 5 illustrates an exemplary noise derivation system which combines a phase-shifting holography system with an SLM. The exemplary system includes a light source 510 which emits a coherent, monochromatic light 520a; an SLM 530 which includes a cover glass 531 and a phase modulator 532, which respectively reflect portions of the light 520a to generate first and second reflected wavefronts 520b and 520c; an imager 540; and a controller 550. Alternatively, the light source 510 may emit polychromatic light (e.g., with multiple wavelengths). The SLM 530 may be, for example, the LCOS SLM 200a or 200b as illustrated above. The cover glass 531 corresponds to the object 440 described in the exemplary phase-shifting holography system illustrated in FIG. 4, for which it is desired to compute a numerical description of the surface thereof. The imager 540 is preferably an electronic imaging device, such as a CMOS image sensor (CIS) or a Charge-Coupled Device (CCD). In some embodiments, the imager 540 may be part of a projection system. In some other embodiments, the imager 540 may be separated from a projection system. In other words, the attenuating wavefront may be determined based on image data (e.g., intensity data corresponding to different phase shifts) collected by an imager either inside or outside of a projection system. The controller 550 controls the phase modulator 532 and receives image data from the imager 540. The controller 550 further derives a compensation wavefront usable to cancel, compensate, attenuate, or reduce DC-noise or other noise introduced by the cover glass 531 (or other transparent material), as will be described in more detail below.

The light 520a is split into two propagating wavefronts when traversing the cover glass 531, with a first portion of the optical energy, the first wavefront 520b, being directly reflected back from the surface of the cover glass 531 as an amplitude and phase modulation. The second portion of the optical energy travels into the phase modulator 532 and interacts with the array of pixels in the phase modulator 532, which introduces predetermined (computer-controlled) phase delays into the wavefront In many physical implementations, the second portion contains the majority of the optical energy incident on the SLM 530. While, for ease of explanation, the first reflected wavefront 520b is shown separate from the second reflected wavefront 520c, in reality the wavefronts may be combined. The resulting interference is captured by the imager 540 so as to be processed by the controller 550, thereby to derive a complex-amplitude description of the surface of the cover glass 531. In this configuration, the SLM 530 itself is intrinsically used as a holographic phase-shifting setup to derive the numerical description of the surface of the cover glass 531. As such, compared with the phase-shifting holography system illustrated in FIG. 4, the noise derivation system illustrated in FIG. 5 requires fewer optical components. Thus, the noise derivation system illustrated in FIG. 5 may result in an apparatus with a decreased cost and an increase in the accuracy of the attenuating wavefront determination. Additionally or alternatively, an SLM or piezoelectric mirror separated from the SLM 530 may be used as a holographic phase-shifting setup.

To derive the attenuating wavefront, the controller 550 may be, for example, a computer including components such as a CPU, a memory, a user interface, communication circuitry, and the like. The derivation itself may be carried out in the controller 550 using hardware components, software components, or a combination of hardware and software components. Additionally or alternatively, one or more processing steps may be performed by a remote computer such as a server. In such a configuration, the controller 550 may upload data for calculation by the remote computer and download the calculation results.

When the SLM 530 is configured with a flat phase-drive signal with overall phase φ, the second reflected wavefront 520c is the light 520a shifted by the overall phase φ. The first reflected wavefront 520b, represented by Γ, may be estimated by using the following expression (3):

$$\Gamma(x', y') = \frac{1}{4}[(I(x', y')_{\varphi=0} - I(x', y')_{\varphi=\pi}) + i(I(x', y')_{\varphi=\pi/2} - I(x', y')_{\varphi=3\pi/2})] \quad (3)$$

In expression (3), i is the imaginary unit, x' and y' are the coordinates at the camera plane (that is, the plane of the imager 540), and $I_\varphi$ is the intensity image recorded by the imager 540 for a given phase-shift φ in the SLM 530. The first reflected wavefront 520b at the camera plane, Γ(x', y'), may be back-propagated numerically into the modulator plane to yield the attenuating wavefront H according to the following expression (4):

$$\tilde{H}(x, y) = \mathcal{F}^{-1}\{\mathcal{F}\{\Gamma(x', y')\}G_{-d_c}\} \quad (4)$$

In expression (4), $\mathcal{F}$ represents the Fourier transform, $\mathcal{F}^{-1}$ represents the inverse Fourier transform, x and y are the coordinates at the modulator plane, $d_c$ is the distance between the imager 540 and the SLM 530, and G is the propagation operator, also known as the transfer function of free space. The propagation operator may be, for example, the Rayleigh-Sommerfeld operator, although other operators and wave propagation functions (such as the Fresnel transform) may be used depending on, among other things, the degree of numerical precision desired, computational complexity requirements, and the distance $d_c$.

In order to calculate the attenuating wavefront H, the pixel pitch of the imager 540 does not need to be exactly the same as the pixel pitch of the SLM 530. In practice, many types of commercially-available imagers have a pixel pitch half that of many types of commercially-available SLMs. In such a case, the first reflected wavefront 520b at the camera plane Γ(x', y') can be interpolated into an SLM pixel grid before back-propagation. In any event, the attenuating wavefront H calculated according to expression (4) above contains information about the distortions introduced by the cover glass 531 (or other transparent material); e.g., surface deformations or irregularities are modulated as amplitude and phase variations.

Compensation of the Phase Drive

Once the attenuating wavefront $\tilde{H}$ has been derived, it may be used to configure the SLM 530 to produce a reconstruction free from noise introduced by the cover glass 531 (or other transparent material). This is referred to as "tuning" the phase-drive signal provided to the SLM 530. However, at least in some embodiments, it may not be sufficient to merely apply the attenuating wavefront $\tilde{H}$ to the phase modulator 532. For example, in many applications the exact (wavelength-accurate) distance between the modulator plane and the reconstruction plane is not known beforehand; thus, to attenuate the noise visible at the reconstruction, the overall phase of the attenuating wavefront $\tilde{H}$ needs to be adjusted such that it destructively interferes with the first reflected wavefront 520b. Furthermore, because the noise introduced by the cover glass 531 (or other transparent material) at reconstruction has low intensity, the attenuating wavefront H should be adjusted to have a similar intensity.

To address the first issue, the attenuating wavefront $\tilde{H}$ from the SLM 530 should be adjusted by a certain phase shift to destructively interfere with the first reflected wavefront 520b, which represents a DC-noise wavefield from the cover glass 531. To account for instances in which $d_c$ is unknown, it is possible to compute multiple attenuating wavefront candidates $\tilde{H}_s$ shifted by phases ranging from s=0 to half the wavelength (λ) of the light 520a, and then select the particular wavefront candidate that yields the reconstruction with the smallest DC-noise effect (e.g., maximizing or optimizing the compensation of the noise). This may be accomplished according to the following expression (5):

$$\tilde{H}_s(x, y) = \mathcal{F}^{-1}\{\mathcal{F}\{\Gamma(x', y')\}G_{s-d_c}(\epsilon, \gamma)\} \quad (5)$$

The phase drive of $\tilde{H}_s$ is the phase component of the complex amplitudes, represented according to the following expression (6):

$$\phi_s = \text{angle}(\tilde{H}_s) \quad (6)$$

To address the second issue, attenuating wavefront $\tilde{H}_s$ needs to be "added" into an existing phase drive ϕ to compensate the reconstruction for the noise effects of the cover glass 531 and DC-noise. This is determined according to the following expression (7):

$$H = e^{i\phi} + \frac{\tilde{H}_s}{a|\tilde{H}_s|} \quad (7)$$

In expression (7), a represents the intensity correction factor, which controls the intensity relationship between the existing phase drive ϕ and the attenuating wavefront $\tilde{H}_s$, by adjusting a power of the attenuating wavefront $\tilde{H}_s$, thereby allowing for the compensation to have the same intensity (or substantially the same intensity) as the noise to be compensated. Then, the compensated phase drive can be obtained by extracting the phase component of the complex amplitudes H. This compensated phase drive is then applied by the controller 550 to the phase modulator 532.

Figure 6:
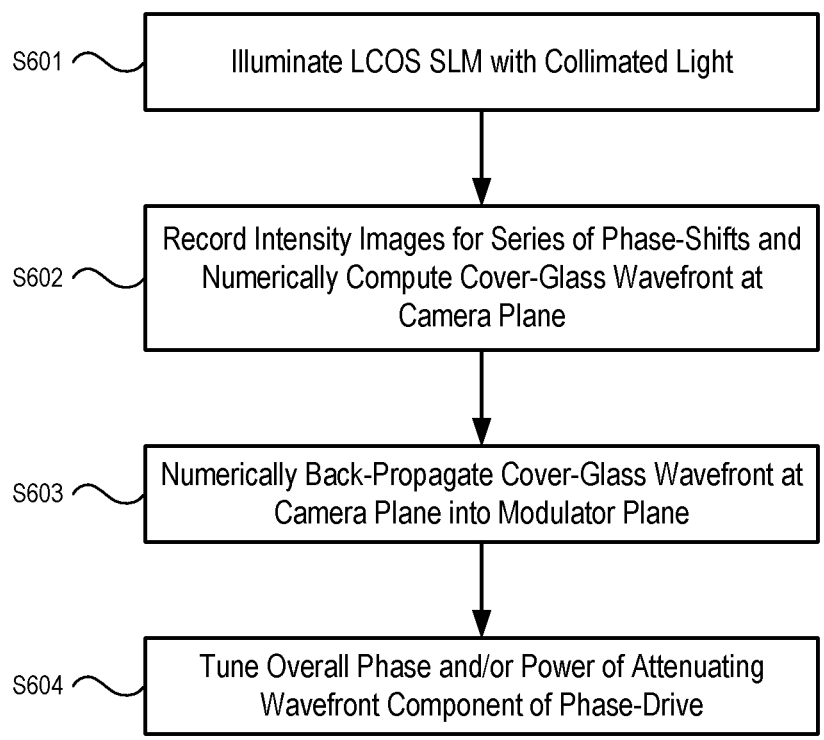
FIG. 6 illustrates a process flow for an exemplary attenuation reduction procedure according to various aspects of the present disclosure.

The exemplary derivation and compensation processes are illustrated in FIG. 6. In step S601, an LCOS SLM (such as the SLM 530) is illuminated with collimated light. At step S602, an imager (such as the imager 540) records intensity images for a series of phase shifts, and numerically computes the cover-glass wavefront (such as the first reflected wavefront 520b) at the camera plane. At step S603, a processor (such as the controller 550) numerically back-propagates the cover-glass wavefront at the camera plane into the modulator plane. At step S604, the processor tunes the overall phase and/or power of the attenuating wavefront component of the phase-drive, which is applied to the SLM.

Figure 7:
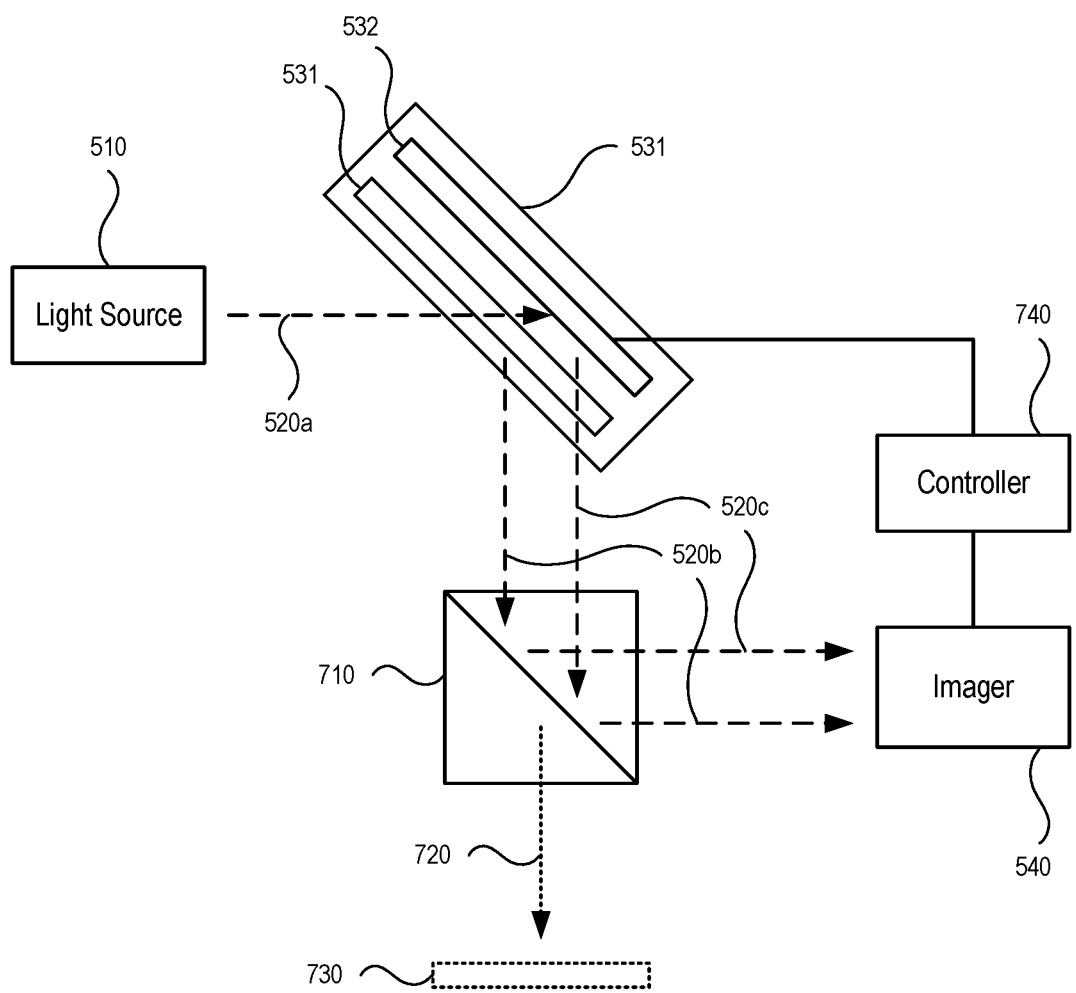
FIG. 7 illustrates a block diagram of another exemplary noise derivation system according to various aspects of the present disclosure.

The derivation process may be performed once during projector calibration, performed at projector startup, or on a per-frame (one or more) basis. For example, the attenuating wavefront can be derived during a calibration stage of a projector production process and can be stored in the projector (e.g., stored in the controller or a storage component). In order to perform the derivation at projector startup or on a per-frame basis, it is possible to simultaneously or alternatingly perform display and image capture operations. FIG. 7 illustrates another exemplary noise derivation system, capable of performing derivation at startup or on a per-frame basis. Several elements of such an exemplary noise derivation system are the same as or substantially similar to corresponding elements of the noise derivation system illustrated in FIG. 5. These elements are represented by the same reference numerals, and a description thereof is not repeated here.

The noise derivation system of FIG. 7 further includes a selective reflective element 710. In implementations capable of performing derivation at startup, the selective reflective element 710 may be a mirror capable of moving into or out of an optical path of the first and second reflected wavefronts 520b and 520c, a beam splitter (either static or movable), and the like. If the selective reflective element is a beam splitter, it reflects only a portion of the first and second reflected wavefronts 520b and 520c, and transmits a transmitted wavefront 720 to a screen 730. If the selective reflective element is a movable mirror, it reflects substantially all of the first and second reflected wavefronts 520b and 520c when in a first position for calibration, and transmits substantially all of the first and second reflected wavefronts 520b and 520c when in a second position for display.

The noise derivation system of FIG. 7 includes a controller 740, which may be structurally similar to the controller 550 illustrated in FIG. 5 or may include more or fewer components compared to the controller 550. In general, the controller 740 may be, for example, a computer including components such as a CPU, a memory, a user interface, communication circuitry, and the like. The derivation itself may be carried out in the controller 740 using hardware components, software components, or a combination of hardware and software components. Additionally or alternatively, one or more processing steps may be performed by a remote computer such as a server. In such a configuration, the controller 740 may upload data for calculation by the remote computer and download the calculation results.

Figure 8:
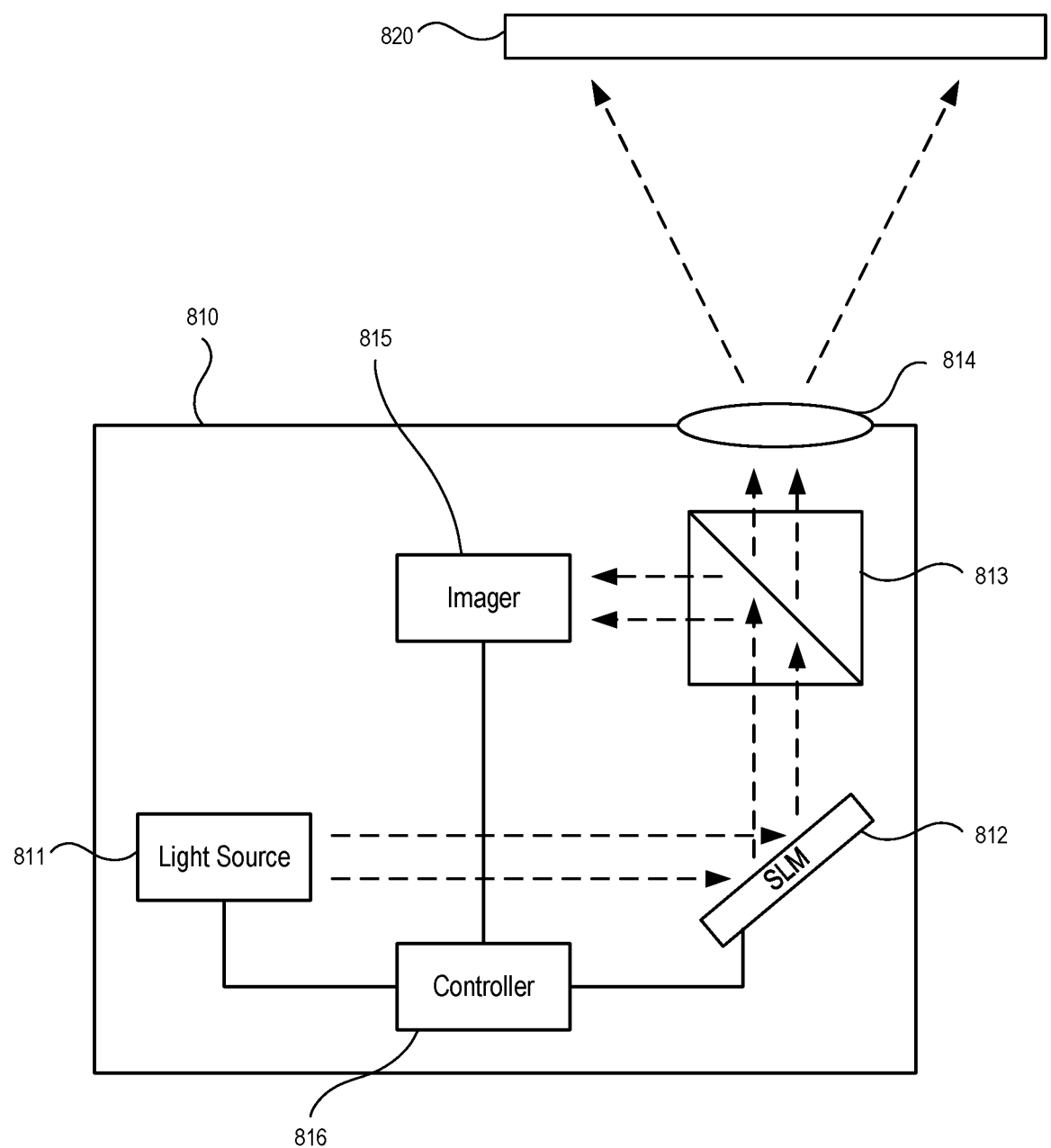
FIG. 8 illustrates a block diagram of another exemplary projector according to various aspects of the present disclosure.

FIG. 8 illustrates a noise derivation system, such as the noise derivation system of FIG. 7, implemented as a projector 810. As illustrated in FIG. 8, the projector 810 includes a light source 811, an SLM 812, a selective reflective element 813, a projection lens 814, an imager 815, and a controller 816. The controller 816 is operatively connected to the light source 811, the SLM 812, and the imager 815. The projector projects light toward a screen 820. In practice, the projector 810 may include additional components such as a memory, input/output ports, communication circuitry, a power supply, and the like. Furthermore, the projector 810 may include additional optical components such as mirrors, lenses, waveguides, optical fibers, beam splitters, diffusers, additional SLMs, and the like. For ease of explanation, these additional components are not illustrated here.

The light source 811 may be, for example, a laser light source, a high-pressure discharge lamp, an LED, and the like. In some aspects of the present disclosure, the light source 811 may comprise multiple light sources 811, each corresponding to a different wavelength or wavelength band. The light source 811 emits light in response to an image signal provided by the controller 816. The controller 816 may be, for example, a processor such as a central processing unit (CPU) of the projector 810. The controller 816 also controls the SLM 812, which receives light from the light source 811. The controller 816 controls and/or receives data from the imager 815. The SLM 812 imparts a spatially-varying modulation, such as a phase modulation, to the light, and redirects the modulated light toward the selective reflective element 813. The selective reflective element 813 may be a beam splitter, in which case it directs a first portion of light to the projection lens 814 and a second portion of light to the imager 815. The selective reflective element 813 may be a movable mirror, in which case it directs substantially all of the light to the imager 815 when in a first position, and allows substantially all of the light to pass to the projection lens 814 when in a second position. The SLM 812 may be, for example, a liquid-crystal-on-silicon (LCOS) SLM, such as a reflective LCOS SLM or a transmissive LCOS SLM. More specifically, the SLM 812 may be a reflective LCOS SLM such as the SLM 200*a* or 200*b* described above. The projector 810 may be configured to form derivation and compensation processes, such as those described above, once at a time of startup of the projector 810 or repeatedly after one or more frames during a display operation of the projector 810.

Figure 9A:
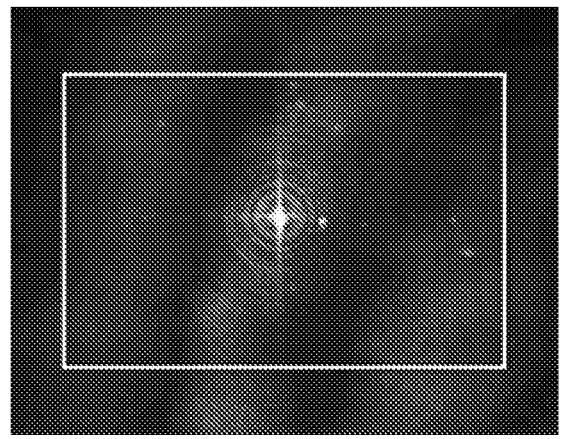
FIG. 9A illustrates an exemplary output image according to various aspects of the present disclosure.
Figure 9B:
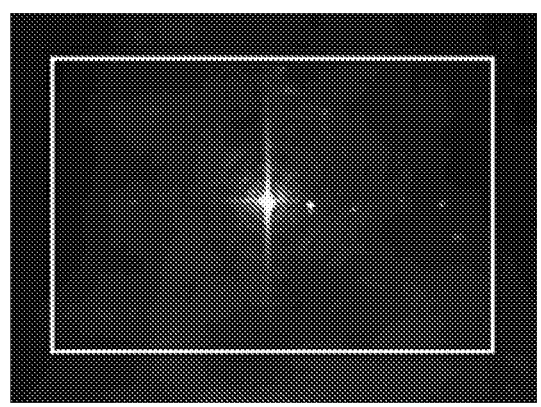
FIG. 9B illustrates an exemplary adjusted output image according to various aspects of the present disclosure.

FIGS. 9A and 9B illustrate an exemplary output image before and after the derivation and compensation processes. FIGS. 9A and 9B may be generated by a system such as the systems shown in FIGS. 4-5 and 7-8, using a method such as the methods shown in FIG. 6. Specifically, FIG. 9A illustrates an exemplary output image in which the derivation and compensation processes have not been performed. As can be seen from FIG. 9A, the output image includes image artifacts due to noise caused by the cover glass or other transparent material, visible as a series of bands. FIG. 9B illustrates an exemplary output image after performing the derivation and compensation processes. As compared to the output image of FIG. 9A, the output image of FIG. 9B is substantially free from image artifacts caused by noise.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A projector system, comprising:
 a light source;
 a spatial light modulator including a substantially transparent material layer and a phase modulation layer, wherein the substantially transparent material layer is a cover glass having a transmissivity of 90% or greater;
 an imaging device configured to receive a light from the light source as reflected by the spatial light modulator, and to generate an image data, wherein the image data includes a first component corresponding to a portion of the light reflected by the substantially transparent material layer and a second component corresponding to a portion of the light reflected by the phase modulation layer; and a controller configured to:
provide a phase-drive signal to the spatial light modulator for producing a reconstruction of the image data that is at least reduced in noise introduced by the substantially transparent material layer, and
determine an attenuating wavefront of the substantially transparent material layer based on the image data by using phase-shifting holography,
wherein the controller is further configured to:
compute a plurality of attenuating wavefront candidates, and to select, as the attenuating wavefront, the attenuating wavefront candidate that yields a reconstruction having a smallest noise effect from among the plurality of attenuating wavefront candidates, and
tune the phase-drive signal based on the attenuating wavefront.

2. The system according to claim 1, wherein the controller is configured to tune the phase-drive signal so as to attenuate a noise introduced by the substantially transparent material layer.

3. The system according to claim 1, wherein the controller is configured to tune the phase-drive signal so as to remove some or substantially all of a noise introduced by the substantially transparent material layer.

4. The system according to claim 1, wherein the controller is configured to determine the attenuating wavefront based on at least the first component.

5. The system according to claim 1, wherein the controller is configured to determine the attenuating wavefront based on a plurality of portions of the image data, respective ones of the plurality of portions of the image data corresponding to different phase-shifts in the phase modulation layer.

6. The system according to claim 1, wherein the controller is configured to adjust an overall phase of the attenuating wavefront such that it destructively interferes with the first component.

7. The system according to claim 1, wherein the controller is configured to adjust a power of the attenuating wavefront to have substantially a same intensity as the first component.

8. A method of driving an optical system, comprising:
providing a phase-drive signal to a spatial light modulator for producing a reconstruction of the image data that is at least reduced in noise introduced by a substantially transparent material layer, the spatial light modulator including the substantially transparent material layer and a phase modulation layer, wherein the substantially transparent material layer is a cover glass having a transmissivity of 90% or greater;
generating an image data based on receiving a light from a light source that has been reflected by the spatial light modulator and received by an imaging device, wherein the image data includes a first component corresponding to a portion of the light reflected by the substantially transparent material layer and a second component corresponding to a portion of the light reflected by the phase modulation layer; and
determining an attenuating wavefront of the substantially transparent material layer based on the image data using phase-shifting holography, wherein the method further comprises:
computing a plurality of attenuating wavefront candidates, and
selecting, as the attenuating wavefront, the attenuating wavefront candidate that yields a reconstruction having a smallest noise effect from among the plurality of attenuating wavefront candidates; and
tuning the phase-drive signal based on the attenuating wavefront.

9. The method according to claim 8, wherein tuning the phase-drive signal includes attenuating a noise introduced by the substantially transparent material layer.

10. The method according to claim 8, wherein tuning the phase-drive signal includes removing some or substantially all of a noise introduced by the substantially transparent material layer.

11. The method according to claim 8, wherein the attenuating wavefront is determined based on at least the first component.

12. The method according to claim 8, wherein the attenuating wavefront is determined based on a plurality of portions of the image data, respective ones of the plurality of portions of the image data corresponding to different phase-shifts in the phase modulation layer, and based on a propagation operator.

13. The method according to claim 11, further comprising adjusting an overall phase of the attenuating wavefront such that it destructively interferes with the first component.

14. The method according to claim 11, further comprising adjusting a power of the attenuating wavefront to have substantially a same intensity as the first component.

15. A non-transitory computer-readable medium storing instructions that, when executed by a processor of a computer, cause the computer to perform operations comprising:
providing a phase-drive signal to a spatial light modulator for producing a reconstruction of the image data that is at least reduced in noise introduced by a substantially transparent material layer, the spatial light modulator including the substantially transparent material layer and a phase modulation layer, wherein the substantially transparent material layer is a cover glass having a transmissivity of 90% or greater;
generating an image data based on receiving a light from a light source that has been reflected by the spatial light modulator and received by an imaging device, wherein the image data includes a first component corresponding to a portion of the light reflected by the substantially transparent material layer and a second component corresponding to a portion of the light reflected by the phase modulation layer;
determining an attenuating wavefront of the substantially transparent material layer based on the image data using phase-shifting holography, the operations further comprising:
computing a plurality of attenuating wavefront candidates, and
selecting, as the attenuating wavefront, the attenuating wavefront candidate that yields a reconstruction having a smallest noise effect from among the plurality of attenuating wavefront candidates; and
tuning the phase-drive signal based on the attenuating wavefront.

* * * * *